United States Patent
Daigle et al.

(10) Patent No.: US 11,511,362 B2
(45) Date of Patent: Nov. 29, 2022

(54) WIRE FOR ELECTRIC DISCHARGE MACHINING

(71) Applicant: CAP Technologies, LLC, Denham Springs, LA (US)

(72) Inventors: Edward O. Daigle, Covington, LA (US); Pratheesh George, Baton Rouge, LA (US)

(73) Assignee: CAP Technologies, LLC, Denham Springs, LA (US)

( * ) Notice: Subject to any disclaimer, the term of this patent is extended or adjusted under 35 U.S.C. 154(b) by 798 days.

(21) Appl. No.: 16/268,256

(22) Filed: Feb. 5, 2019

(65) Prior Publication Data

US 2020/0246892 A1    Aug. 6, 2020

(51) Int. Cl.
  *B23H 1/06*    (2006.01)
  *B23H 7/24*    (2006.01)
  *B23H 7/08*    (2006.01)

(52) U.S. Cl.
  CPC ............ *B23H 1/06* (2013.01); *B23H 7/08* (2013.01); *B23H 7/24* (2013.01)

(58) Field of Classification Search
  CPC ... B23H 7/08; B23H 1/06; B23H 7/24; B32H 7/24; C25D 3/12; C25D 3/22; C25D 3/565; C25D 7/0607
  See application file for complete search history.

(56) References Cited

U.S. PATENT DOCUMENTS

| | | | | |
|---|---|---|---|---|
| 4,740,666 A * | 4/1988 | Tomalin | ............... | B23H 7/08 219/69.12 |
| 5,945,010 A * | 8/1999 | Tomalin | ............... | B23H 7/08 219/69.12 |
| 6,368,467 B1 * | 4/2002 | Andrews | ............... | C25D 17/10 204/164 |
| 2003/0085113 A1 * | 5/2003 | Andrews | ............... | B08B 7/00 204/164 |
| 2004/0089636 A1 * | 5/2004 | Gonnissen | ............... | B23H 7/08 219/69.1 |
| 2006/0138091 A1 * | 6/2006 | Lee | ............... | B23H 7/08 219/69.12 |
| 2007/0278108 A1 * | 12/2007 | Rosenzweig | ............... | C25B 1/02 205/637 |
| 2009/0022620 A1 * | 1/2009 | Weber | ............... | F16C 33/121 420/471 |
| 2011/0290531 A1 * | 12/2011 | Baumann | ............... | B23H 7/08 174/126.2 |
| 2015/0040375 A1 * | 2/2015 | Daigle | ............... | C25D 7/0614 29/527.2 |
| 2015/0373964 A1 * | 12/2015 | Gaag | ............... | C22C 9/04 59/61 |
| 2017/0014928 A1 * | 1/2017 | Chang | ............... | B23H 7/08 |
| 2019/0276918 A1 * | 9/2019 | Yang | ............... | C22C 33/0235 |

FOREIGN PATENT DOCUMENTS

WO    WO-2016023326 A1 *   2/2016    ............ B21C 1/02

* cited by examiner

*Primary Examiner* — Geoffrey S Evans

(74) *Attorney, Agent, or Firm* — Warner J. Delaune; Phelps Dunbar LLP

(57) ABSTRACT

A conductive electrode wire for use in an electric discharge machine (EDM) is provided, comprising a core wire comprised of one single metal or an alloy of multiple metals with a coating deposited by the electro-plasma process, wherein such coatings are alloys of zinc and nickel. A process for treating a surface of an electrically conductive workpiece, such as a core wire, is also provided.

16 Claims, 3 Drawing Sheets

WIRE FOR ELECTRIC DISCHARGE MACHINING

BACKGROUND OF THE INVENTION

1. Field of the Invention

The present invention relates to electrical discharge machining (EDM) wire and tubes coated with certain alloys, specifically zinc-nickel alloys and copper-zinc alloys in the gamma phase applied using aqueous electro plasma technology.

2. Description of Related Art

In wire electrical discharge machining (WEDM), also known as wire-cut EDM and wire cutting, a thin single-strand metal wire, usually brass, is fed through the workpiece, submerged in a tank of dielectric fluid, typically deionized water. Wire-cut EDM is typically used to cut plates as thick as 300 mm and to make punches, tools, and dies from hard metals that are difficult to machine with other methods. The wire, which is constantly fed from a spool, is held between upper and lower guides. The guides, usually CNC-controlled, move in the x-y plane. On most machines, the upper guide can also move independently in the z-u-v axis, giving rise to the ability to cut tapered and transitioning shapes (circle on the bottom, square at the top for example). This allows the wire-cut EDM to be programmed to cut very intricate and delicate shapes.

The wire-cut process uses water as its dielectric fluid, controlling its resistivity and other electrical properties with filters and PID controlled de-ionizer units. The water flushes the cut debris away from the cutting zone. Flushing is an important factor in determining the maximum feed rate for a given material thickness. Along with tighter tolerances, multi axis EDM wire-cutting machining centers have added features such as multi heads for cutting two parts at the same time, controls for preventing wire breakage, automatic self-threading features in case of wire breakage, and programmable machining strategies to optimize the operation. Wire-cutting EDM is commonly used when low residual stresses are desired, because it does not require high cutting forces for removal of material.

The history of EDM electrode construction has predominantly focused on gamma phase brass copper-zinc alloy wire. The present invention does not differentiate with regard to the base substrate material but more specifically to the plasma applied coatings which are different from conventional electroplated or hot dip coatings.

Prior art such as U.S. Pat. No. 5,945,010 describes the first practical construction of the gamma phase brass copper-zinc alloy system. The following or subsequent art are variations of the original U.S. Pat. No. 5.945,010, such as U.S. Pat. Nos. 7,723,635, 8,067,689, 8,378,247 and PCT/US17/55465. It is significant that no new coating constructions have been developed which can provide significant productivity improvements in EDM machining. U.S. Pat. No. 6,585,875 describes an improved process and apparatus for cleaning and coating an electrically conductive surface using Electro Plasma Technology (EPT) as it relates to the application of single metals, dual metal alloys or multiple metal alloys. The referenced patents focus on the base wire construction in the gamma $^\gamma$-phase (Cu/Zn) supplemented by Beta $^\beta$-phase and Epsilon $^E$-phase components. The present invention focuses on the coating configuration and make-up of the component alloy parts.

EPT prior art such as UK-A-1399710, U.S. Pat. Nos. 5,958,604, 5,981,084, 5,700,366 and 6,585,875 teach that the plasma process (high voltage) operates in an electrical regime in which the current decreases or remains essentially the same as voltage is increased, and the process is characterized by the formation of light emitting plasma at the onset of the unstable region.

UK-A-1399710 teaches that the gas film must be continuous and the electrical regime which describes the current as decreasing or remaining fairly constant as voltage is increased described the "unstable" regime characterized as the descending half of the first current increase curve.

WO-A-97/35051 describes an electrolytic process for cleaning and coating electrically conducting surfaces which is similar in process to WO-A-97/35052 except that the anode comprises a metal for metal coating of the surface of the workpiece. In these publications, an arc discharge or electro-plasma is formed on the surface of the workpiece and is established within the bubble layer. Coating may be achieved under the regime of operation by using an inert anode and an electrolyte containing ions of the metal to be coated as described in WO-A-99/15714. In this case the process becomes a special form of electroplating, but because it occurs at high voltage in the presence of an arc discharge, and the plating is faster than normal electroplating and the coating has better adhesion to the substrate metal.

SUMMARY OF THE INVENTION

In a preferred embodiment, a conductive electrode wire for use in an electric discharge machine is provided, comprising a core wire comprised of one single metal or an alloy of multiple metals with a coating deposited by the electro-plasma process, wherein such coatings are alloys of zinc and nickel. The core wire is a conductive single metal or alloy of metals, wherein the electrode wire is approximately 65% zinc and 35% copper, or approximately 80% carbon steel.

In some embodiments, the wire is coated with a coating having a zinc content greater than 15%. In other embodiments, the wire is coated with a coating that has a body centered cubic crystalline (BCC) structure. In other embodiments, the wire is coated with a coating that remains continuous with 100% surface coverage after drawing.

In a more preferred embodiment, the wire is coated with a coating that remains continuous with 100% surface coverage after drawing with a reduction of 74% to 85% of its original diameter, and the core wire is not exposed through the coating following drawing with a maximum reduction of 85% of the original diameter.

Also in one embodiment, a process for treating a surface of an electrically conductive workpiece, such as a core wire, is also provided, comprising placing a movable workpiece within a reaction chamber, wherein the reaction chamber includes an anode, and wherein the workpiece is the cathode; establishing a gap between the anode and cathode; applying an aqueous electrolyte into the reaction chamber through orifices in the anode onto the workpiece to establish an electrically conductive path between the anode and cathode; applying a DC voltage to the electrically conductive medium in excess of 30 VDC, so that a gas/vapor phase and a liquid phase fills the reaction chamber; adjusting the voltage to establish an electro-plasma discharge sufficient to cause positive ions in the electrically conductive medium to become concentrated near the surface of the workpiece and cause micro-zonal melting of the surface in the area of discreet plasma bubbles; and operating the reaction chamber to cause positive ions of one or more coating metals to be deposited to move toward the workpiece by kinetic energy created by the implosion of the hydrogen bubble.

In another embodiment, a process for coating an electrical discharge machining (EDM) wire, wherein the EDM wire is constructed of any conductive material by electro plasma process (EPT), wherein the coating metal comprises zinc or nickel, or an alloy of zinc and nickel.

In a preferred embodiment, the core wire is an alloy of zinc and copper.

In another preferred embodiment, the core wire is a steel wire of low carbon content (1008) or a wire with high carbon content (1092).

In another embodiment, the core wire, alloy or steel, is conductive and positively charged ions of one or more coating metals are deposited onto the reactive surface of the workpiece forming a mixing or alloy between the core wire, wherein the coating metal is deposited to a depth of 150 angstroms to 3 microns.

Preferably, a heated electrolyte containing coating metal ions is introduced into the reaction chamber during the EPT process.

More preferably, a heated conductive electrolyte is introduced into the reaction chamber and an electrical current is applied between the anode and cathode sufficient to cause disassociation of hydrogen and oxygen from the aqueous solution and ebullition at the surface of the cathode.

In another embodiment, deposition of the coating metal is achieved without the initiation or growth of an intermetallic layer between the workpiece and the coating metal.

In yet another embodiment, deposition of the coating metal is achieved without creation of a phase diffusion boundary layer.

In another embodiment, deposition of the coating metal is achieved without causing hydrogen embrittlement of the workpiece.

In a more preferred embodiment, an electromagnetic field is formed within the reaction chamber causing the coating metal crystals to grow or lay in a plane parallel to the surface of the workpiece creating a slip condition which enhances ductility and drawability of the coating metal.

The above and other objects and features of the present invention will become apparent from the drawings, the description given herein, and the appended claims.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Figure 1:
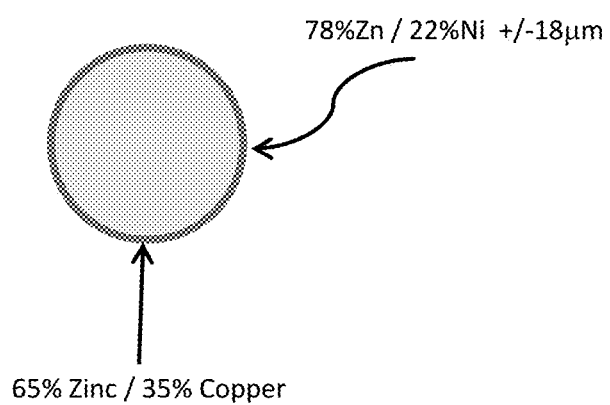
FIGS. 1-3 are schematic illustrations of various core wires to which are applied coatings using the EPT process to produce embodiments of EDM wire in accordance with the present invention.
Figure 2:
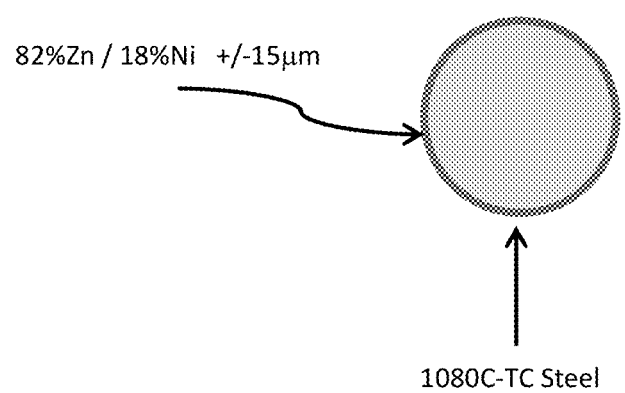
Figure 3:
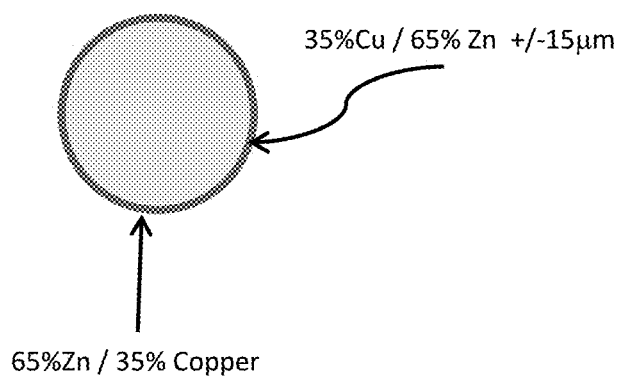

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Conventional applications utilize electroplating of component metals followed by diffusion annealing creating a very brittle intermetallic phase due to a complex crystal structure which created difficulty in drawing which when drawn created a discontinuous coating. The most useful EDM wire applications required a high tensile strength electrode (wire). Hot dip applications of nickel or nickel-zinc create a brittle intermetallic layer between the base metal and the pure metal coatings. This intermetallic layer can only be controlled by applying very thin coatings. However, while a thinner coating (<5 μm) performs better due to the lack of the intermetallic layer, adhesion of the coating when attempting drawing is affected adversely. The ability to apply a hot dip zinc-nickel alloy exists, however the required bath temperature (+/−800° C.) exacerbates the issue of the intermetallic growth and substantially alters the mechanical and tensile properties of the substrate material.

The present invention relates to a new and improved EDM wire coated with a nickel-zinc alloy or with a 35copper-65zinc alloy. The invention does not impact the substrate wire material regardless of the elemental make-up but relates to the aqueous plasma process utilized for applying the alloy coating, which is well adhered, can be drawn due to its ductile nature and precise control of the deposition rate of the coating.

The aqueous plasma process is unlike conventional electroplating processes is several important ways:
  (a) Conventional electroplating utilizes low (<20 VDC) voltage ion transfer.
  (b) Conventional electroplating does not create plasma of any type and operates on the upslope of the standard electrolytic electrical curve, e.g. a low voltage regime.
  (c) Conventional electroplating is controlled by Faraday's Law, which is expressed in two parts which relate to electroplating. In one, the mass of a material liberated during electrolysis is proportional to the amount of electricity passed (coulomb). A flow of 1 amp for 1 second equals 1 coulomb. By doubling the current, the quantity of electrons in transit doubles. The number of ions (+& −) reaction at the charged electrodes is doubled, thereby doubling the masses of substances. The masses of substances liberated are proportional to time and current (quantity of electricity applied). The second part of Faraday's Law states that different substances liberated by the same value of electricity are proportional to their atomic mass divided by the valence of their ions. Faraday's Constant, which is 96,500 coluomb/mole, is the amount of electricity required to liberate a mole of mono-valent ions. Faraday's Law as it pertains to conventional electroplating is unbreakable, i.e. it is absolute.
  (d) Conventional electroplating has to overcome the phase diffusion boundary layer as coating thickness increases.
  (e) Conventional electroplating is subject to hydrogen embrittlement.
  (f) In conventional electroplating, metal deposition occurs without the mixing of the applied metal and the substrate metal.

In contrast, aqueous plasma or electro plasma technology (EPT) is substantially different from conventional electrolytic metal deposition in the following ways:

(a) EPT is a high (>20 VDC) voltage process and operates on the downslope of the standard electrolytic electric curve.

(b) EPT deviates from Faraday's Law due to the elimination of the phase diffusion boundary layer which allows free movement of metal ions regardless of the coating thickness. Deviation from Faraday's Law with EPT changes for several reasons; the formation of a gas envelope around the workpiece and formation of hydrogen bubbles which exist within the gas envelope. Due to the formation of the hydrogen bubbles and the accumulation of metal ions (+) migrating to the cathode surface (−) the electrolyte takes on dielectric properties causing resistance to build within the hydrogen bubble. The electric field strength reaches ~$10^5$ V/m gas space the gas inside of the bubble is ionized and a plasma discharge takes place. The positive ions which were concentrated on the surface of the bubble are accelerated to the surface of the workpiece to be deposited as a coating. Using an oscilloscope shows a peak of high electric current at this time. A single hydrogen bubble has a physical size of ~0.1-1.0 $mm^2$ and a life of ~$10^{-6}$ seconds. The discharges occur with a frequency of ~$10^4/10^5$ Hz. This means the whole cathode surface is not covered by plasma but limited to a quantity of discrete discharges at any one time. As the bubble implodes and the stored energy is released into the gas layer, kinetic energy is bounced from the liquid layer to the surface of the workpiece and back again, cavitation occurs and the ions to be deposited are accelerated to the cathode surface. The movement of ions takes place mainly by ion acceleration through the plasma and ion bubble absorption transport as the bubble collapses. Both of these modes of transport eliminate the phase diffusion boundary layer which exist in conventional electroplating and creates higher deposition rates.

(c) EPT creates light emitting glow discharge plasma. The occurrence of the individual discharges produce an electromagnetic impulse, a light and heat explosion that disturbs and ionizes the hydrogen gas.

(d) EPT does not create hydrogen embrittlement in the base metal or in the coating.

(e) EPT does not produce an intermetallic layer.

(f) EPT does not alter or modify the metallurgical properties of the base metal in any way, including tensile strength.

(g) The temperature of the discharge reaches temperatures of >2,000 C under the bubble which causes the discrete area under the bubble to become molten, which creates an alloying or mixing condition between the substrate metal and the applied metal or alloy. Without the intermetallic layer and with the mixing effects, the adhesion properties are substantially greater than conventional processes such as electroplating or hot dipping.

EPT follows a typical current-voltage curve whereby the current increases linearly following Faraday's Law. The regime is characterized by gas liberation at the near surface of the cathode, $H_2$ & $O_2$. The high voltage characteristics of EPT enhances greatly the water electrolysis and will produce excess hydrogen which will migrate toward the cathode and will be the source for bubble formation. At a certain point first luminescence can be observed. This phenomenon is due to electrolytic vaporization due to Joule heating and to the hydrodynamic instabilities in solvent vaporization at the electrode. These two factors contribute to the transition of normal electrolysis to continuous glow discharge plasma. The glow color is dependent on the metal ions present in the electrolyte. The heating of the workpiece continues, which at a point causes the oxygen generation to block ionization of the hydrogen bubble which substantially reduces the effects of the process.

In consideration of the above mentioned characteristics of the EPT process, the present invention relates to EDM wire or electrodes coated with a nickel or copper based alloy containing zinc as one of the alloying elements, such as Copper-Nickel, Copper-Zinc, and Nickel-Zinc as non-limiting examples. In conventional electrolytic nickel-zinc alloy deposition, the nickel content is limited to approximately 8%-15%, however the coating is brittle and not well adhered as witnessed with coating loss during drawing. The limitation of the alloy nickel content potentially limits the required melting point of the deposited coating. This represents a formidable obstacle to adapt the co-plating alloy technology to wire coating constructions. The coatings created as described for this invention are coatings applied by EPT.

The present invention, that is the use of EPT for depositing coatings on gamma phase wire, is not limited to only brass gamma phase wire. EPT can deposit the gamma phase coatings on any conductive substrate and has been demonstrated on high, medium and low carbon wire, stainless steel, titanium, and aluminum. For purposes directly related to EDM wire, the following examples are limited to EDM wire and the coatings applied for use in EDM operations.

EXAMPLES APPLYING EMBODIMENTS OF THE PRESENT INVENTION

Example 1

A mother wire (substrate) composed of 35% copper and 65% zinc, brass was cleaned and coated by the EPT process.
Diameter: 0.039"
Cleaning Electrolyte: 8% Na2HCO3
Cleaning Voltage: 130 VDC
Cleaning Amperage: 24 Amps
Coating: 85% Zinc/15% Nickel
Coating Voltage: 140 VDC
Coating Amperage: 80 Amps A coating with a thickness of 14 to 16 microns was deposited in a continuous reel to reel configuration with a deposition time (dwell) of 15 seconds. Coating thickness was determined by cross section analysis and composition of the metals by EDS elemental mapping Quantax measurement.

The wire was drawn to a diameter of 0.028" and analyzed by scanning electron microscopy (SEM) to determine coating continuity which was 100%. The wire was further drawn to 0.020" and again analyzed by SEM to show coating continuity which again was 100% coverage. The wire was warped around its own diameter several times, removed and the turns analyzed by SEM to examine for cracks or delamination, none were found.

Example 2

A mother wire (substrate) composed of 35% copper and 65% brass was cleaned and coated by the EPT process.
Diameter: 0.039"
Cleaning Electrolyte: 8% Na2HCO3
Cleaning Voltage: 125 VDC Cleaning Amperage: 26 Amps
Coating: 82% Zinc/18% Nickel
Coating Voltage: 135 VDC
Coating Amperage: 78 Amps A coating with a thickness of 12 to 15 microns was deposited in a continuous reel to reel configuration with a deposition time (dwell) of 13 to 15 seconds. Coating thickness was determined by cross section analysis and composition of the metals by EDS elemental mapping Quantax measurement. The wire was drawn to 0.020" and trials were conducted for comparing the EPT wire with the four leading EDM wires produced commercially by other manufacturers.

| Wire Type | Time Sealed | % Increase | Time Open | % Increase |
|---|---|---|---|---|
| EPT 18Ni82Zn | 00:14:40 | n/a | 00:29:12 | n/a |
| Gamma D | 00:15:20 | 4.55 | 00:31:38 | 8.33 |
| Blaze | 00:16:36 | 13.18 | 00:34:28 | 18.04 |
| Gamma Brass | 00:19:19 | 31.70 | 00:36:32 | 25.11 |
| OKI (Brass) | 00:24:44 | 68.64 | 00:44:46 | 53.31 |

1—Excetek W500G, D-2 hardened 52-56Rc, 2.365" thick, sealed flush, 19KG top/bottom, 10 uS, with no wire breaks, and 0.10" diameter wire. The cut is 0.400"33 0.400" with a 0.20" lead in and 0.100" tab, 0.20" space on all sides of punch to keep sealed flush. Total cut length 1.83340".

Example 3

A mother wire (substrate) composed of 35% copper and 65% brass was cleaned and coated by the EPT process.
Diameter: 0.047"
Cleaning Electrolyte: 8% Na2HCO3
Cleaning Voltage: 125 VDC
Cleaning Amperage: 26 Amps
Coating: 82% Zinc/18% Nickel
Coating Voltage: 135 VDC
Coating Amperage: 78 Amps A coating with a thickness of 12 to 15 microns was deposited in a continuous reel to reel configuration with a deposition time (dwell) of 13 to 15 seconds. Coating thickness was determined by cross section analysis and composition of the metals by EDS elemental mapping Quantax measurement. The wire was drawn to 0.020" to determine coating adhesion and ductility. No loss of coating was determined by SEM analysis.

Example 4

A brass tube used for EDM purposes was cleaned and coated by the EPT process.
Tube Diameter: 0.040"
Cleaning Voltage: 90 VDC
Cleaning Amperage: 7 Amps
Coating: 82% Zinc/18% Nickel
Coating Voltage: 120 VDC
Coating Amperage: 20-22 Amps A coating with a thickness of 10 to 14 microns was deposited in a continuous reel to reel configuration with a deposition time (dwell) of 8 to 10 seconds. Thickness was determined by cross section analysis which was difficult due to the softness of the tube as it readily collapsed. Surface EDS analysis indicated the presence of only zinc/nickel and cross section elemental mapping indicated the metal content as zinc 84% and nickel at 16%.

Example 5

A high carbon, high tensile wire with a diameter of 0.079" was cleaned and coated with a 80% zinc and 20% nickel coating with a thickness of 24 microns then drawn to 0.031" diameter.
Starting wire diameter: 0.079"
Cleaning Voltage: 125 VDC
Cleaning Amperage: 120 Amps
Coating Voltage: 130 VDC
Coating Amperage: 135 Amps Coating thickness on 0.079" diameter wire was ~24 microns. The coated wire was then dry drawn to a diameter of 0.031". The drawn wire was cross sectioned to determine coating thickness and composition. Drawn wire coating thickness: ~9.5 microns. Coating composition as determined by EDS analysis; zinc 78%/nickel 22%. In a wrap test, the wire was wrapped on its own diameter, 5 turns on and 5 turns off times three. In torsion tests, three individual tests were conducted with an average number of 48 turns. Bend Test: 900×10×3. SEM analysis of the wire after wrap, torsion and bend tests indicate no coating delamination or cracking.

Example 6

A brass wire [65Zn/35Cu] with a diameter of 0.047" (1.1938 mm) was cleaned and coated with a 35% copper and 65% zinc coating with a thickness of ~12 μm then drawn to a diameter of 0.031" (0.7874 mm).
Starting wire diameter: 0.04"
Cleaning Voltage: 115 VDC
Cleaning Amperage: 18 Amps
Coating Voltage: 122 VDC
Coating Amperage: 22 Amps
Process Travel Speed: 35 feet per minute
Electrolyte Temperature: 74/750 C The wire was then drawn to 0.031" (0.7874 mm) dry draw to determine the adhesion, ductility and drawability of the coating. Typically such a wire would be wet drawn. The wire was subjected to a torsion test to determine coating adhesion and ductility. The wire was also wrapped on its own diameter with 20 turns on. The torsion and wrap sections were examined by SEM to determine if any cracks, chips, or delamination could be determined, none were observed.

Example 7

A high carbon wire with a diameter of 0.079" (2.0066 mm) was cleaned and coated with Chromium Sulfate (Cr2SO4) Anhydrous, 7.5% metal content in solution.
Starting wire diameter: 0.079"
Cleaning Voltage: 125 VDC
Cleaning Amperage: 130 Amps
Coating Voltage: 130 VDC
Coating Amperage: 135 Amps Coating thickness on 0.079" diameter wire; ~14 microns. The coated wire was then dry drawn to a diameter of 0.031". The drawn wire was cross sectioned to determine coating thickness and composition. Drawn wire coating thickness: ~5.5 microns. Coating composition as determined by EDS analysis; 99.2% Chrome. Wrap Test: The wire was wrapped on its own diameter, 5 turns on and 5 turns off. Torsion: Average number of turns 41. Bend Test: 900×10×3.

The description and illustrations are by way of example only. While the description above makes reference to various embodiments, it should be understood that many changes and modifications can be made without departing from the scope of the disclosure. Many more embodiments and implementations are possible within the scope of this invention and will be apparent to those of ordinary skill in the art. The invention is not limited to the specific details, representative embodiments, and illustrated examples in this description.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

We claim:

1. A conductive electrode wire for use in an electric discharge machine, comprising a core wire having an original diameter comprised of one single metal or an alloy of multiple metals with a coating of alloys of zinc and nickel or alloys of zinc and copper, wherein the thickness of the coating is at least twelve microns (12 µm) prior to drawing, and wherein the coating on the core wire has adherence properties sufficient to permit drawing of the coated wire to a final diameter of between a sixty percent (60%) and eighty-five percent (85%) reduction of the original diameter without any exposure of the core wire through the coating.

2. The electrode wire of claim 1, wherein the core wire is an alloy of metals, and wherein the core wire is 80% carbon steel by weight.

3. The electrode wire of claim 1, wherein the core wire is an alloy of metals, and wherein the core wire is 65% zinc and 35% copper by weight.

4. The electrode wire of claim 3, wherein the coating of the core wire has a zinc content greater than 15% by weight.

5. The electrode wire of claim 3, wherein the coating of the core wire has a body centered cubic crystalline (BCC) structure.

6. The electrode wire of claim 3, wherein the coating of the core wire remains continuous with 100% surface coverage after drawing.

7. The electrode wire of claim 3, wherein the coating of the core wire remains continuous with 100% surface coverage after drawing with a reduction of 74% to 85% of its original diameter.

8. A process for producing a coated wire for use in electric discharge machining from an electrically conductive core wire having an original diameter, comprising:

placing a movable core wire within a reaction chamber, wherein the reaction chamber includes an anode, and wherein the core wire is the cathode;

establishing a gap between the anode and core wire;

applying an aqueous electrolyte into the reaction chamber through orifices in the anode onto the core wire to establish an electrically conductive path between the anode and core wire;

applying a DC voltage to the electrically conductive medium in excess of 30 VDC, so that a gas/vapor phase and a liquid phase fills the reaction chamber;

adjusting the voltage to establish an electro-plasma discharge sufficient to cause positive ions in the electrically conductive medium to become concentrated near the surface of the core wire and cause micro-zonal melting of the surface of the core wire in the area of discreet plasma bubbles;

operating the reaction chamber to cause positive ions of one or more coating metals to be deposited to move toward the core wire by kinetic energy created by the implosion of the plasma bubbles;

coating the core wire to produce a coated wire having a coating thickness of at least twelve microns (12 µm); and drawing the coated wire to a final diameter of between sixty percent (60%) and eighty-five percent (85%) reduction of the original diameter of the core wire after which the core wire is not exposed.

9. The process of claim 8, wherein the coating metal comprises zinc or nickel, or an alloy of zinc and nickel.

10. The process of claim 8, wherein the core wire is an alloy of zinc and copper.

11. The process of claim 8, wherein the core wire is a steel wire of low carbon content or a wire with high carbon content.

12. The process of claim 8, wherein a heated conductive electrolyte is introduced into the reaction chamber and an electrical current is applied between the anode and the core wire sufficient to cause disassociation of hydrogen and oxygen from the aqueous solution and ebullition at the surface of the core wire.

13. The process of claim 8, wherein deposition of the coating metal is achieved without the initiation or growth of an intermetallic layer between the core wire and the coating metal.

14. The process of claim 8, wherein deposition of the coating metal is achieved without creation of a phase diffusion boundary layer between the core wire and the coating metal.

15. The process of claim 8, wherein deposition of the coating metal is achieved without causing hydrogen embrittlement of the core wire.

16. The process of claim 8, wherein an electromagnetic field is formed within the reaction chamber causing the coating metal crystals to grow or lay in a plane parallel to the surface of the core wire creating a slip condition which enhances ductility and drawability of the coating metal.

* * * * *